United States Patent [19]

Roncaglione

[11] Patent Number: 4,628,562

[45] Date of Patent: * Dec. 16, 1986

[54] VEHICLE WASHING APPARATUS

[76] Inventor: James W. Roncaglione, 9807 Bridleridge Ct., Vienna, Va. 22180

[ * ] Notice: The portion of the term of this patent subsequent to Apr. 16, 2002 has been disclaimed.

[21] Appl. No.: 608,215

[22] Filed: May 8, 1984

Related U.S. Application Data

[63] Continuation-in-part of Ser. No. 493,344, May 10, 1983, and Ser. No. 493,345, May 10, 1983, Pat. No. 4,510,639.

[51] Int. Cl.⁴ .............................................. B60S 3/06
[52] U.S. Cl. .................................. 15/53 AB; 15/179; 15/181; 15/DIG. 2
[58] Field of Search .................. 15/21 D, 21 E, 53 A, 15/53 AB, DIG. 2, 179, 181, 213, 230, 230.12-230.19, 104.1 R, 104.2; 114/222

[56] References Cited

U.S. PATENT DOCUMENTS

| | | | |
|---|---|---|---|
| 1,218,005 | 3/1917 | Schlemmer | 15/104.2 X |
| 2,074,213 | 3/1937 | Deem | 15/104.2 X |
| 2,190,206 | 2/1940 | Churchill | 15/DIG. 2 |
| 2,637,056 | 5/1953 | Movain | 15/179 X |
| 3,089,168 | 5/1963 | Blanford . | |
| 3,138,815 | 6/1964 | James, Jr. | 15/103 |
| 3,510,898 | 5/1970 | Tatara et al. . | |
| 3,683,441 | 8/1972 | Fromme | 15/97 B |
| 3,693,206 | 9/1972 | Tatara et al. . | |
| 3,881,208 | 5/1975 | Miner . | |
| 4,001,907 | 1/1977 | Capra . | |
| 4,021,877 | 5/1977 | Miner . | |
| 4,024,598 | 5/1977 | Miner . | |
| 4,192,036 | 3/1980 | Heymann . | |
| 4,198,722 | 4/1980 | Ennis . | |
| 4,270,958 | 6/1981 | Ennis . | |
| 4,299,003 | 11/1981 | Ennis . | |
| 4,332,625 | 6/1982 | Ennis . | |
| 4,354,291 | 10/1982 | Ennis . | |

FOREIGN PATENT DOCUMENTS

| | | | |
|---|---|---|---|
| 491788 | 4/1953 | Canada | 15/104.2 |
| 634606 | 8/1936 | Fed. Rep. of Germany | 15/104.2 |
| 2450484 | 5/1976 | Fed. Rep. of Germany | 15/DIG. 2 |
| 381331 | 10/1932 | United Kingdom | 15/179 |
| 749711 | 7/1980 | U.S.S.R. . | |

Primary Examiner—Edward L. Roberts
Attorney, Agent, or Firm—Birch, Stewart, Kolasch & Birch

[57] ABSTRACT

A vehicle washing apparatus including overhead frame means located above the path of a vehicle to be washed, a plurality of elongate vertically disposed flexible and rotatable washing members connected with the overhead frame means arranged to wash at least one end and the top of a vehicle passing through the apparatus and rotating means for rotating the washing members to enhance the scrubbing action of the washing members.

18 Claims, 25 Drawing Figures

VEHICLE WASHING APPARATUS

CROSS-REFERENCE TO RELATED APPLICATIONS

This application is a continuation-in-part of copending application Ser. No. 493,344 and 493,345 (now U.S. Pat. No. 4,510,639 which issued on Apr. 16, 1985) which were each filed on May 10, 1983.

BACKGROUND OF THE INVENTION

1. Field of the Invention

The present invention relates to a vehicle washing apparatus and improved brushes for use therein capable of efficiently washing vehicles of various shapes and sizes.

2. Brief Description of the Prior Art

Various overhead mounted brushes for washing the front, sides and rear of vehicles being washed are known in the art. In order to prevent damage to vehicles being washed and in order to obtain efficient washing of vehicles, it is desirable to mount these overhead brushes in such a way that when the brushes contact the vehicle, the brushes swing and/or slide out of the path of the vehicle. It is also desirable to mount these brushes in such a manner that the brush can bend or flex relative to the drive shaft thereof. U.S. Pat. Nos. 3,188,208, 4,021,877 and 4,024,598 to Miner disclose vehicle washing brushes of this general type. U.S. Pat. Nos. 4,198,722, 4,270,958, 4,332,625 and 4,299,003 to Ennis disclose additional vehicle washing brushes for accomplishing the above-mentioned result. U.S. Pat. No. 4,035,862 to Ennis et al discloses similar vehicle washing brushes.

One of the problems associated with the car wash apparatus disclosed in the above-described Ennis and Ennis et al patents is that when the brushes contact a vehicle moving relative thereto, the brushes bounce out of the path of the car without properly washing the car. The present invention is therefore directed to solving this and other problems which will be discussed further hereinbelow which are associated with prior vehicle washing apparatus.

SUMMARY OF THE INVENTION

The present invention is directed to a new type of vehicle washing apparatus which utilizes a flexible cable or support member to support vehicle washing material. The cables which are used to support the vehicle washing materials, such as brushes, may be braided metal cables which are flexible but which are not highly resilient. Heretofore, plastic shafts or tubes have been used to support brushes. These plastic shafts are resilient and thus when they are deformed they generate a force which causes the shaft to return to the normal straight position. However, when the cables of the present invention are deformed, they do not generate a significant force which causes them to return to the straight position. Plastic cables formed from braided reinforced nylon or another plastic or synthetic material may be used instead of the metal cables. Other materials which are substantially non-resilient when flexed in an amount which is encountered during washing of a vehicle may also be used. The cable can be a single continuous cable or a plurality of parallel cables. Alternatively, a plurality of cables may be connected end to end or sections of cable may be used to connect sections of vehicle washing brushes. Any materials which have the same function, may be substituted for the cables. The degree of flexibility of the cable or support member will vary depending upon the length, weight and size of the brushes and the ultimate intended use of the brush.

During operation, when the brushes contact a vehicle, the cable is deformed in response to pressure from the vehicle. However, because of the non-resilient nature of the cable, the brush does not push back to a large extent against the vehicle. In contrast, metal shafts and plastic shafts are either rigid or resilient, respectively, and thus do not yield to the vehicle in the same manner as the flexible non-resilient support members of the present invention. By utilizing plastic cables the overall weight of the brushes can be reduced thereby reducing the strain on the overhead support arm and/or overhead support frame. By utilizing flexible cables to support the vehicle washing material or brushes, a vehicle washing apparatus is provided whereby sufficient flexibility is imparted to the brushes so that the brushes do not bounce out of the way of a vehicle when the vehicle contacts the brushes. Depending on how the brushes are mounted, a vehicle washing apparatus capable of washing the front, sides and rear surface of a vehicle being washed can be produced.

Preferably, the vehicle washing apparatus includes two brushes which are mounted in the path a vehicle to be washed. The vehicle washing apparatus can be of the drive-through type wherein the vehicle washing apparatus is stationary and the vehicle is propelled therethrough. An example of this type of apparatus is disclosed in co-pending application Ser. No. 415,928 in the name of James W. Roncaglione which was filled on Sept. 8, 1982, the entire contents of which are hereby incorporated by reference. Another example of this type of apparatus is disclosed in U.S. Pat. No. 4,225,995 to George T. Ennis which issued on Oct. 7, 1980, the entire contents of which are hereby incorporated by reference. Alternatively, the vehicle washing apparatus can be of a type wherein the vehicle to be washed remains stationary and the apparatus moves relative thereto. An example of this type of apparatus is U.S. Pat. No. 4,320,551 to James W. Roncaglione which issued on Mar. 23, 1982, the entire contents of which are hereby incorporated by reference. In one embodiment of the present invention, when the front of the vehicle to be washed contacts the brushes, the brushes move apart slightly to allow the vehicle in pass therebetween. However, because of the flexible nature of the cable, the tops of the brushes will not move as far apart as the bottoms of the brushes of certain prior art vehicle washing apparatuses. As the vehicle moves between the brushes, the brushes wash respective sides of the vehicle and after the vehicle has passed therebetween, the brushes wash the back of the vehicle. The vehicle can easily pass in either direction through the vehicle washing apparatus by changing the rotation of the brushes in a conventional manner.

The brushes can be mounted in the vehicle washing apparatus in a variety of manner. A preferred method of mounting the brushes is to mount each brush on an overhead brush support arm which is pivotal about a generally vertical axis. The two brushes are urged toward each other to a closed position in the path of the vehicle to be washed. Upon contact of the brushes with the vehicle being washed, the brush support arms and the brushes pivot out of the path of the vehicle to an open position and wash the sides of the vehicle as the vehicle passes therebetween. After the vehicle passes through the apparatus, the brushes return to the closed position.

The brushes are generally supported at the top only of the brush and do not contain a support for the bottom end of the brush. The overhead supported brushes of the present invention can also be employed in vehicle washing apparatuses of the type disclosed in the previously mentined Minor patents or other known car wash apparatuses.

In one aspect of the present invention, the present invention is directed to a vehicle washing apparatus including overhead support means located above or adjacent to the path of a vehicle to be washed, an elongate vertically disposed flexible and rotatable washing member having a free lower end and being supported at the upper end thereof by said support means, said washing member comprising a flexible elongate cable, a plurality of washing material support members secured to said cable and washing material supported by said support members and rotating means for imparting rotary motion to the upper end of said rotatable washing member. The present invention is also directed to a vehicle washing apparatus including overhead support means; an elongate vertically disposed flexible and rotatable washing member supported by said support means, said elongate washing member comprising a flexible elongate cable having washing material thereon; and rotating means for imparting rotary motion to said rotatable washing member. The present invention is also directed to a vehicle washing member comprising a flexible elongate cable; a coupling member at only one end of said cable capable of imparting rotary motion to said cable; and washing material arranged along the length of said support means.

The present invention is also directed to a novel and unique method for connecting a cable with a coupling member. In a preferred embodiment of this method a metal cable is inserted into the narrow end of a truncated cone-shaped cavity in said coupling member. After the cable is inserted into the cone-shaped cavity of the coupling member, the strands of the metal cable are pulled apart and frayed to increase the surface area of the cable and to increase the diameter of the cable at the end thereof. The cable is then washed with appropriate solvents and a bonding material such as a molten metal is poured into the cone-shaped cavity to securely bond the metal cable to the coupling member. Other bonding materials such as plastic, epoxy and Liquid Steel may be used in some situations.

Thus, a vehicle washing member can be formed which comprises a flexible cable, a coupling member arranged around said cable adjacent one end thereof; and a bonding material securely bonding said cable to said coupling member. In a preferred embodiment the brush comprises a flexible cable; a coupling member having a cone-shaped cavity adapted to receive said coupling member; and bonding material in said cone-shaped cavity securely bonding said cable to said coupling member.

A yieldable coupling of the type disclosed and claimed in co-pending application Ser. No. 415,928 filed on Sept. 8, 1982 can optionally be utilized in accordance with the present invention. Shock absorbers and other devices can also be optionally used in conjunction with the present invention.

By utilizing cables to support the vehicle washing brushes, a new and unique effect is observed when the brushes wash a vehicle passing therebetween. The brushes have a tendency to hang on the vehicle being washed therebetween and the flexibility of the cables allows the brushes to conform to the front, side and rear surfaces of the vehicle being washed. As mentioned previously, the tendency of the brushes to bounce away from a vehicle which contacts the brushes is lessened in accordance with the present invention. The metal cables are stronger than the plastic shafts which have been suggested for use by Ennis and the metal cables do not become brittle in cold weather as is the case with certain types of plastics. Since the cables are flexible but non-resilient (as compared with plastic shafts), this property apparently contributes to the unique action of the brushes of the present invention whereby the brushes conform slightly to the front, side and rear contours of a vehicle.

It is another object of the present invention to provide a vehicle washing apparatus which has one or more vertical washing or scrubbing members which are capable of washing or scrubbing the front, top and/or sides of vehicles having various shapes and sizes. The washing members can be arranged in the form of a screen or curtain, a plurality of screens or curtains or can be arranged in an overhead loop. The apparatus can also be provided with means for imparting horizontal or reciprocating movement to the washing members to enhance the surface coverage and scrubbing action of the washing members.

In one embodiment of the present invention each washing member comprises flexible elongate axial support means for supporting a washing material thereon and washing material arranged on the axial support means. The washing material can be arranged intermittently along the length of the axial support means, however, preferably the washing material is arranged substantially continuously along the entire length of the axial support means.

The axial support means can be coated with a layer of protective material which does not scratch the painted surface of a vehicle being washed. The axial support means can be encased in a sheet of this protective material whereby the sheet functions to prevent contact of the axial support means with a vehicle being washed and also functions to connect the washing material with the axial support means.

In one embodiment of the present invention each of the washing members includes an elongate flexible axial support member, washing bristles arranged along the length of the axial support member and a protective material encasing the axial support member. The washing bristles are embedded into and protrude from the protective material.

The present invention is also directed to improved washing members adapted for use in a vehicle washing apparatus. These rotatable washing members include an elongate flexible washing portion capable of conforming to surface contours of a vehicle to be washed, which is preferably rotationally symmetrical, having washing material on the outer surface thereof, a freely swinging first longitudinal end portion having washing material or protective material thereon and a second end portion adapted for connection with means for rotating the washing member. These improved washing members may include elongate flexible support means for supporting a washing material and washing material arranged along the length of the support means. One longitudinal end of the flexible support means may be provided with a protective material or may be provided with washing material to thereby prevent or minimize scratching of the painted surface of a vehicle being washed if the brushes are to be passed over the top of the vehicle during washing. In one embodiment of the invention the elongate flexible support means is encased in a protective material in which washing bristles are embedded. In another embodiment of the invention the elongate flexible support means is covered with or encased in a resilient porous material such as a sponge or polyurethane foam rubber. The elongate flexible support means can also be covered with or encased in any soft material such as felt which is capable of washing a vehicle surface without scratching the paint.

DETAILED DESCRIPTION OF THE DRAWINGS

Figure 1:
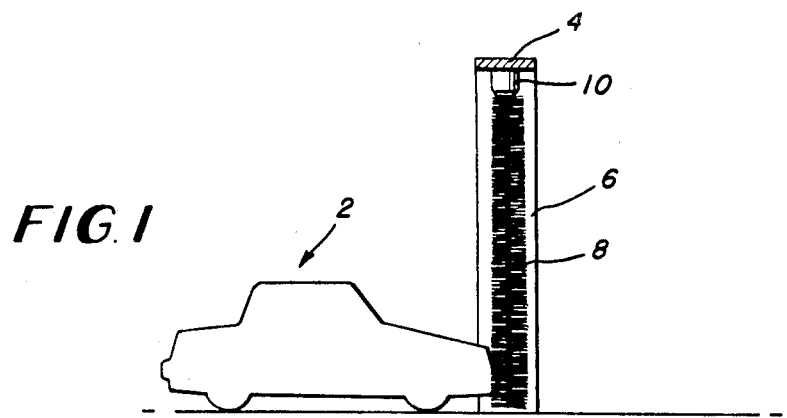
FIGS. 1-3 are side views of one embodiment of the vehicle washing apparatus of the present invention which sequentially show a vehicle passing through the apparatus.
Figure 2:
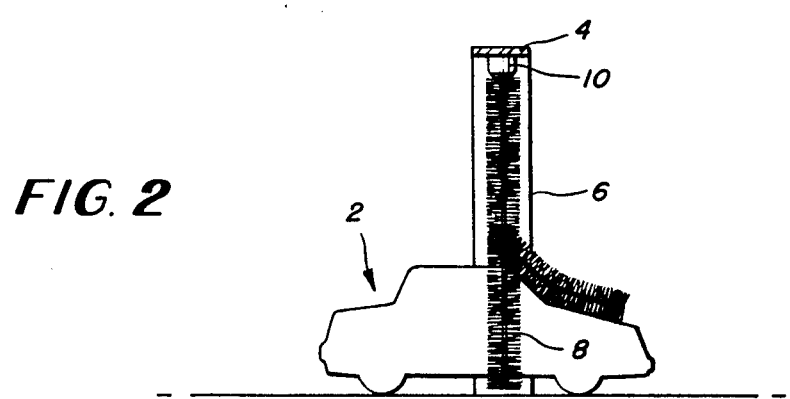
Figure 3:
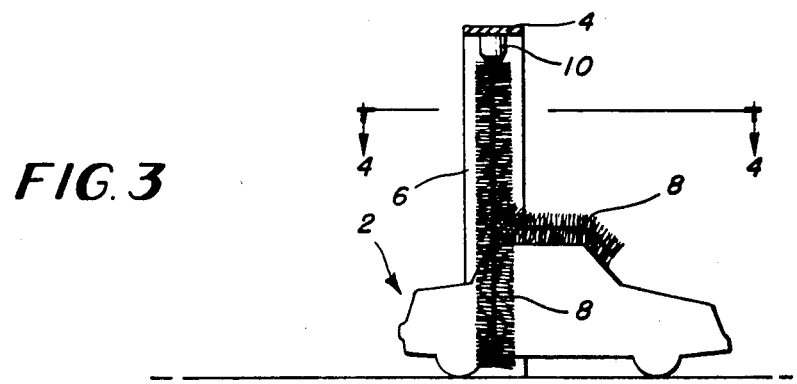
Figure 4:
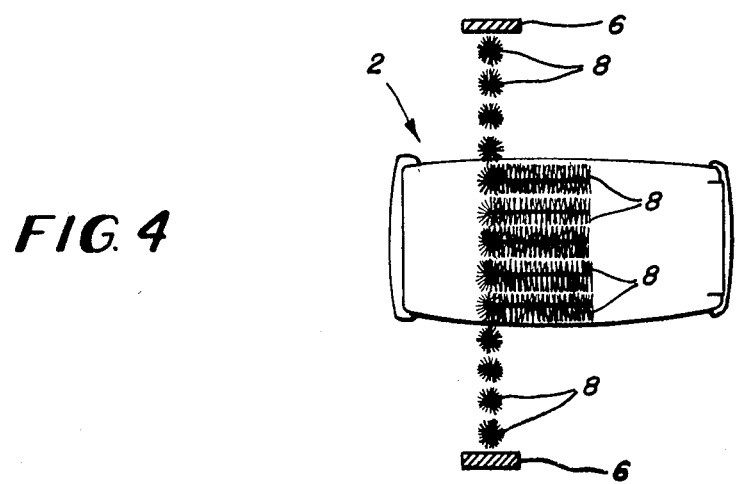
FIG. 4 is a top view taken along line 4—4 of FIG. 3.

FIGS. 1-3 show a vehicle 2 passing through the vehicle washing apparatus of the present invention. The vehicle washing apparatus comprises an overhead support member 4 and a pair of side support members 6. Attached to the overhead support member 4 are a plurality of elongate flexible washing members or brushes 8 which are individually driven by a motor 10. Alternatively, the brushes can be driven by a sprocket and chain arrangement which will be described in more detail hereinafter.

As apparent from FIGS. 1-4, the vehicle washing apparatus of the present invention can efficiently wash the front, hood, front windshield, roof and trunk of a passenger car. It will be easily understood that the apparatus can also wash corresponding surfaces on other types of vehicles such as vans, station wagons, trucks, etc. The apparatus is also capable of washing the sides of a vehicle passing therethrough.

In the embodiment of FIGS. 1-4, a stationary vehicle washing apparatus is shown wherein a vehicle to be washed passes through a screen of rotating flexible brushes. The vehicle can be conveyed through the apparatus by a conventional conveyor mechanism or the vehicle can simply drive slowly through the apparatus. Alternatively, the vehicle can remain stationary and the vehicle washing apparatus can be conveyed along the length of the stationary vehicle.

The curtain or screen of brushes contain a plurality of brushes so that the complete and efficient washing of the vehicle can be effected. The number of brushes in the screen will depend upon the size of the vehicle to be washed and will also depend on the size and mounting arrangement of the individual brushes. Usually, in this embodiment of the invention, the vehicle washing apparatus will contain a minimum of five brushes, with seven or more brushes normally being employed and with at least ten or more brushes being preferable. The brushes which wash only the top surfaces of the vehicle can be somewhat shorter than the brushes which wash the sides of the vehicle. Soap and water can be applied in a usual manner and spray nozzles and pipes can be mounted on the overhead and side support members 4 and 6.

One of the unique and characteristic features of the embodiment of the present invention shown in FIGS. 1-4 is that the brushes are designed in such a manner so that they can conform to the surface of a vehicle being washed thereby achieving efficient cleaning of the vehicle. Many different types of brush structures are contemplated to be encompassed by the present invention, however, the brushes must have sufficient flexibility and weight so that they will be easily deflected from the normal vertical position when a car passes therethrough. As shown in FIG. 3, the brushes which contact the top surfaces of the vehicle should be designed and mounted in such a manner that when a vehicle passes through the apparatus, the brushes can flex sufficiently to allow the lower portion of the brush to lay generally horizontally on the roof of a vehicle. By utilizing brushes which have this high degree of flexibility, damage to vehicles which inadvertently pass through the apparatus at a relatively high speed can be eliminated or minimized.

In normal operation the vehicle to be washed moves relative to the apparatus at a slow speed. The brushes are rotated at a slow, moderate or high speed. In accordance with the present invention scratching of the painted vehicle surfaces can be minimized to an extent because the brushes can be rotated at a relatively low speed while effecting efficient cleaning of the vehicle. One of the reasons that the prior art brushes are rotated at a relatively high speed is that the brushes are rotated in a direction and in a speed which is sufficient to assist in quickly urging the brushes out of the path of the vehicle which is passing through the brushes. Since, in accordance with the present invention, a brush arrangement can optionally be utilized wherein it is not necessary to move the brushes to the sides of the vehicle being washed, a lower brush rotation speed can be utilized. Furthermore, the vehicle speed control is not as critical in accordance with the present invention since it is not always necessary to cause the brushes which wash the front of the vehicle to swing to the sides of the vehicle. For example, if a generally horizontal brush is utilized to wash the front and top of the vehicle, the speed of the vehicle becomes more critical since the horizontal brush must rise by a pulley system up over the front grill, up the front windshield and onto the roof, down the back windshield and onto the trunk and finally down the back bumper of the vehicle. Such precise speed control can be minimized in accordance with the present invention.

Figure 5:
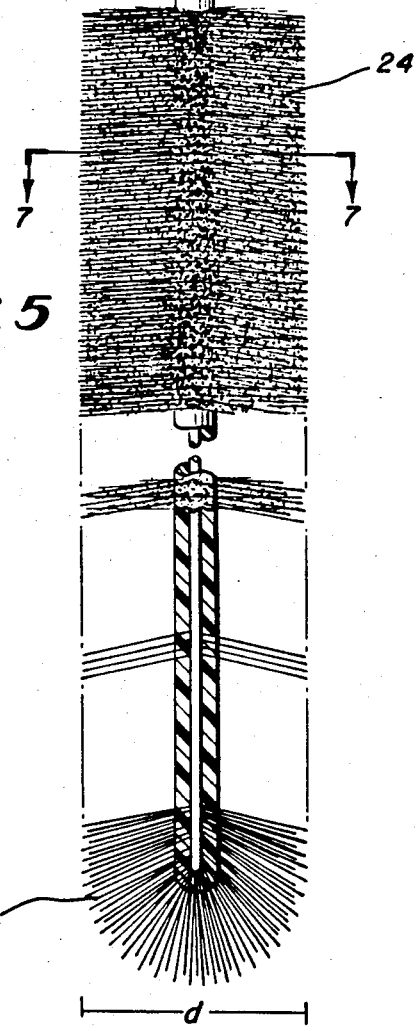
FIG. 5 is a side view of one embodiment of the flexible washing brush of the present invention having a coupling device mounted on one longitudinal end thereof.

FIG. 5 discloses one embodiment of the present invention wherein the elongate washing member includes a flexible axial support member 20. In a preferred embodiment of the present invention the axial support member 20 is formed from a single or unitary elongated piece of flexible material such as a braided steel cable. However, the axial support member can be made of a variety of materials which have sufficient flexibility to conform to the contours of a vehicle being washed and which also have sufficient strength to support a washing material thereon. The axial support member 20 should also be capable of effectively transmitting rotary motion to the washing material. Possible additional materials which could be utilized instead of the steel cable are a braided plastic such as braided nylon cable or a flexible member which is composed of a plurality of sections or links such as a chain. It is also possible that the axial support member can be composed of a plurality of relatively short rigid sections which are loosely connected and wherein the washing material is secured to each of the relatively short rigid sections. The relatively short rigid sections can be connected by a linking mechanism such as a chain link or can be connected by short sections of flexible material.

This type of brush is described in more detail in copending application Ser. No. 493,344 entitled, FLEXIBLE VEHICLE WASHING BRUSH AND COUPLING THEREFOR in the name of James Roncaglione which was filed on May 10, 1983. The entire contents of this application are hereby expressly incorporated by reference. It is important, however, to construct the flexible washing member in such a manner that when it contacts the surface of a vehicle being washed, there are no hard, sharp or abrasive surfaces or protrusions which could scratch a painted surface.

In view of the above requirements the brush shown in FIG. 5 is formed from a non-resilient steel cable 20 which is encased or coated with a protective material 22. The protective material 22 is preferably formed from a tough plastic material which does not have an abrasive surface. In the embodiment of FIG. 5 the protective material completely encases the flexible axial support member 20. It should be noted that even if the brush stops rotating and the brush is dragged over the top surface of the vehicle being washed, the washing and/or protective material is arranged in such a manner that a painted surface of a vehicle will not be damaged.

Figure 7:
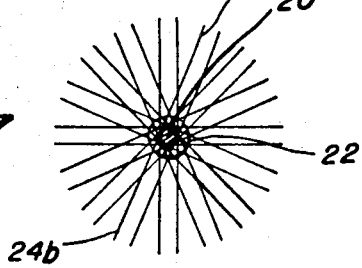
FIG. 7 is a cross-sectional view taken along line 7—7 of FIG. 5.

Washing bristles 24 are embedded in the protective material 22. Preferably, the length of each bristle is approximately equal to the diameter of the brush, i.e., each bristle is embedded in the protective material 22 at a portion which is substantially intermediate to the ends of the bristle. This feature of the present invention is shown more clearly in FIG. 7 wherein it is shown that a bristle is embedded in the protective material at a portion which is directly between the ends 24a, 24b of the bristle.

The bristles can be formed from a variety of commercially available materials. The bristles should have a length sufficient to form a washing member which has a diameter "d" of about 6-36 inches, preferably 6-24 inches. It is preferable that the brushes are densely packed on the flexible axial support member. The bristles should be arranged on the axial support member in such a manner that efficient washing of the vehicle can be accomplished even when the brushing member is rotated at a relatively low speed. By decreasing the diameter of the brushes, as compared with certain brushes which are currently being used in the trade, it is possible to decrease the bristle tip speed for a given r.p.m. thereby reducing damage to painted surfaces.

However, if desired, larger brushes can be constructed. These brushes have a diameter "d" of about 12-80 inches, preferably 40-72 inches. The brushes can be rotated at very low, moderate or very high rpm's depending on the size and structure of the brushes and the results desired.

The flexible axial support member should be at least as long as the height of a vehicle to be washed if the brush is being used to wash the front or sides of a vehicle. The axial flexible support member, and thus the brushing member, is usually at least 1½ meters long, preferably at least 2 meters long and can be 3 meters or longer for larger vehicles. Each brushing member is arranged so that the lower end thereof is close to but does not touch the ground during rotation.

Figure 8:
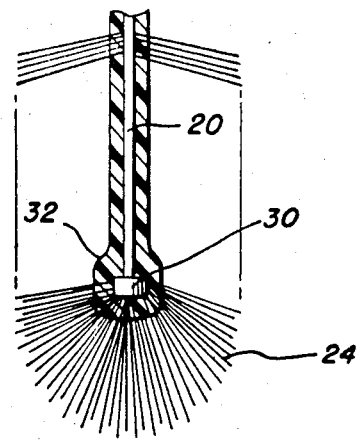
FIG. 8 is a detailed view of one embodiment of a protective end structure for the elongate flexible brush.

FIG. 8 shows one embodiment of the present invention wherein an enlarged portion 30 is provided on the end of the axial support member 20. An enlarged ball or covering 32 of the protective material is provided around the enlarged portion 30 to provide additional material for attachment of the bristles at the end of the washing member. This particular type of arrangement is provided in order to more effectively protect the lower end of the brush thereby preventing scratching of the vehicle surface by the end of the washing member when a vehicle passes thereunder.

Figure 9:
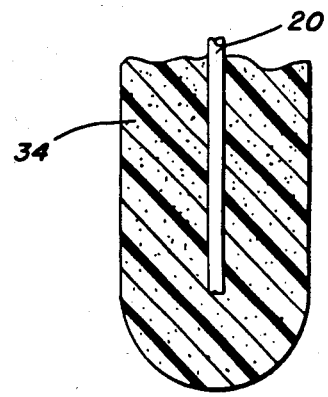
FIG. 9 discloses a flexible brush wherein the flexible support member is encased in a porous resilient material.

FIG. 9 discloses an alternate embodiment of the present invention wherein the axial support member 20 is encased or covered with a polyurethane foam material 34. Other materials which are porous, resilient and/or water adsorbent can be substituted for the polyurethane in this embodiment of the invention.

Figure 6:
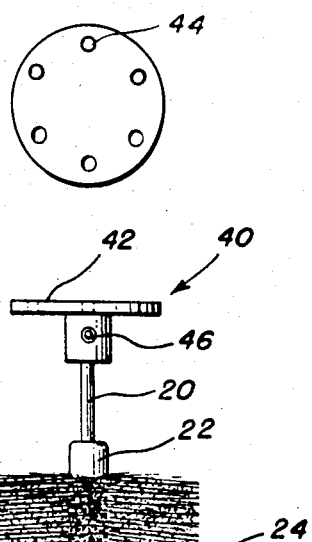
FIG. 6 is an end view of the coupling device of FIG. 5.

Referring again to FIGS. 5 and 6, a coupling member 40 is secured to the upper end of the brushing member. The coupling member includes a generally disc-shaped plate portion 42 having a plurality of holes 44 formed therein. The coupling device is secured to the axial support member 20 by means of a bolt 46 or other appropriate fastening device. The preferred fastening arrangement is disclosed in previously mentioned application Ser. No. 493,344 entitled, FLEXIBLE VEHICLE WASHING BRUSH AND COUPLING THEREFOR in the name of James W. Roncaglione filed on May 10, 1983.

Figure 10:
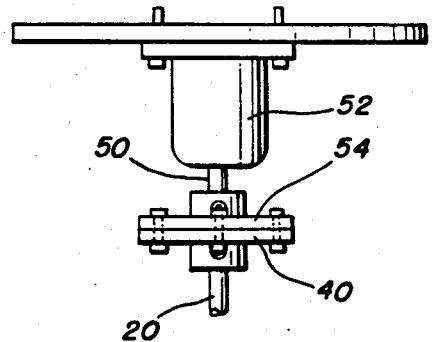
FIG. 10 shows one possible arrangement for mounting and driving the flexible washing member.

FIG. 10 discloses additional details of the washing member driving arrangement shown in FIGS. 1-4. As shown in FIG. 10, the axial support member 20 is operably connected with the drive shaft 50 of an electric motor 52 by means of a coupling device 54 which is connected with the coupling device 40. The coupling devices 40 and 54 are secured together by a plurality of bolts which pass through respective holes in the respective coupling members.

Figure 11:
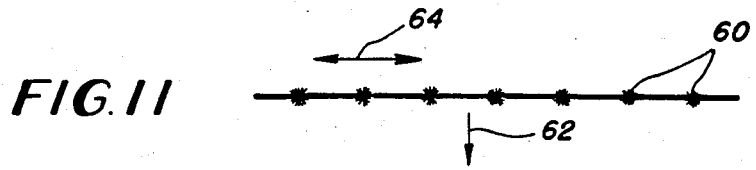
FIGS. 11-13 are schematic top views showing various arrangement for the flexible washing members.
Figure 12:
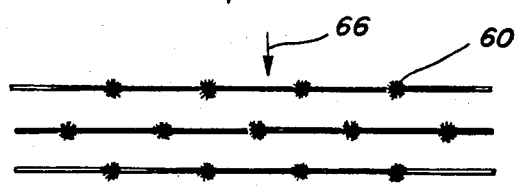
Figure 13:
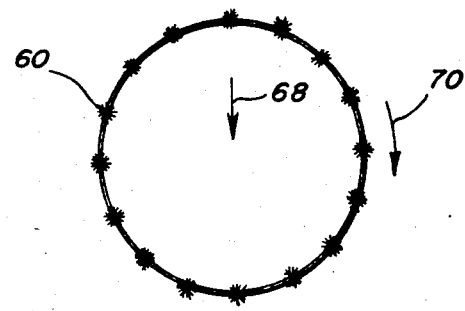

FIGS. 11-13 are schematic top views of various possible arrangements for the flexible brushes. In FIG. 11 the flexible brushes 60 are arranged in a screen or curtain. A vehicle passes through the screen or curtain in the direction of the arrow 62. Means can be provided for reciprocating the screen or curtain in the direction of the arrow 64 whereby the scrubbing action of the washing members is enhanced and whereby more complete coverage of the vehicle being washed is effected. FIG. 12 discloses an embodiment wherein a plurality of screens or curtains of brushes are provided. The vehicle passes through the apparatus in the direction of the arrow 66. Preferably, the brushes 60 in each screen or curtain are arranged in a staggered configuration. FIG. 13 discloses an embodiment of the invention wherein the vehicle to be washed passes through a rotating overhead loop of brushes 60. The vehicle passes through the apparatus in the direction of the arrow 68 and the overhead loop of brushes rotates in the direction of the arrow 70.

Figure 14:
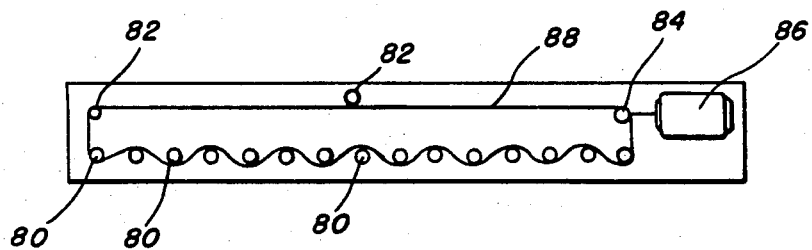
FIG. 14 shows one possible drive arrangement for driving a plurality of flexible washing members.

FIG. 14 is a schematic view of a possible drive arrangement for the brushes wherein a sprocket 80 is provided at the upper end of each brushing member. Guide sprockets 82 are provided and a drive sprocket 84 is also provided. A motor 86 drives the drive sprocket 84 which transmits motion to a sprocket chain 88 thereby imparting rotary movement to each of the sprockets 80. It should be noted that by utilizing this drive arrangement adjacent flexible brushes will be driven in an opposite direction of rotation.

Figure 15:
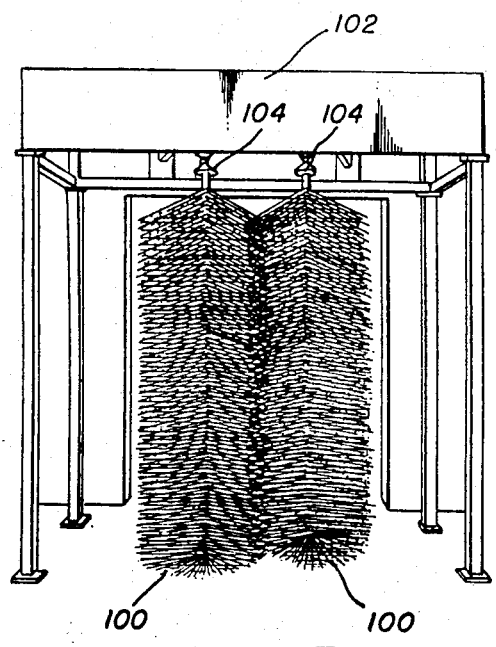
FIGS. 15-18 show an alternate use for the brushes of the present invention.
Figure 16:
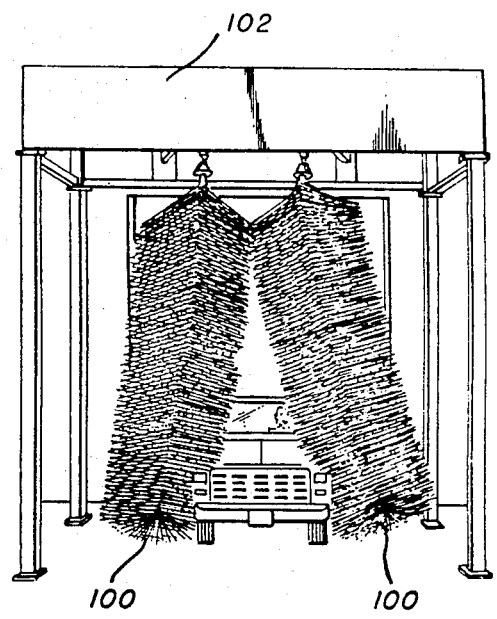
Figure 17:
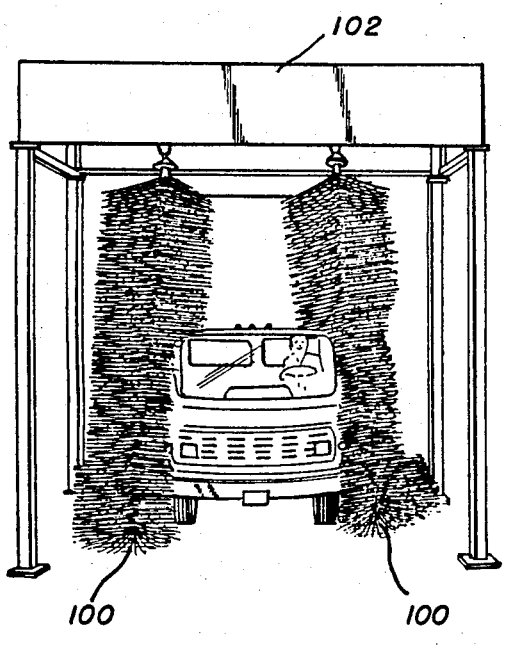
Figure 18:
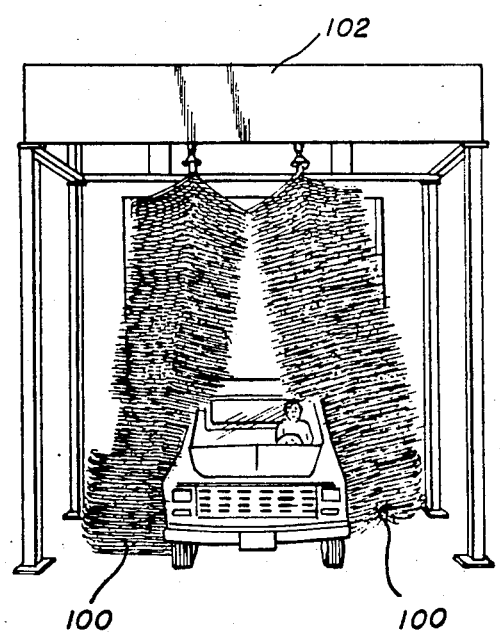

FIGS. 15-18 relate to an embodiment of the invention where two large brushes 100 are utilized. FIG. 15 shows the rotating brushes before a vehicle has contacted the brushes. FIGS. 16-18 show the brushes in contact with a vehicle. In this embodiment of the invention the upper ends of the brushes are not fixedly secured to the overhead support member 102. Thus, when a vehicle passes through the apparatus the upper ends of the brushes, as well as the lower ends of the brushes, move apart. The upper ends of the brushes can be mounted in a variety of manners. A preferred mounting arrangement is disclosed in previously mentioned application Ser. No. 493,344, filed on May 10, 1983. A flexible coupling 104 which may be used to connect the drive arrangement with the brush is disclosed in copending application Ser. No. 415,928, filed on Sept. 28, 1982, the entire contents of which are hereby incorporated by reference.

As previously mentioned, the brushes can be mounted in the apparatus in a variety of manners. Thus, the brushes can be mounted on overhead support tracks whereby they slide apart when a vehicle passes through the apparatus. This type of mounting is disclosed in the previously mentioned Miner patents. Alternatively, the brushes can be mounted by an overhead support arm arrangement shown in FIG. 19. The overhead support arm arrangement comprises a stationary support frame (shown in FIGS. 15-18) to which the support arm arrangement is attached. The arrangement includes a pivotally mounted horizontal brush support arm 120 which is mounted for pivotal movement by a pair of vertically aligned bearings 122 and a vertical rod 23. The bearings 122 can be mounted on the overhead support means at a point overhead and inside the path of the vehicle to be washed or can be mounted outside of the path of the vehicle to be washed. A conventional motor and transmission (not shown) are arranged on the support arm 120 at an appropriate location for imparting rotary motion to the brush 110. The brushes are urged to a closed position in the path of the vehicle being washed by means of a pulley, cable and weight system which will be discussed further hereinafter with respect to FIG. 24. Other devices can be used to urge the brushes toward a closed position in the path of the vehicle to be washed.

A motor, chain and sprocket arrangement rotates a generally vertical upper drive shaft 130 which is mounted for rotational movement within a housing 131. The housing 131 is pivotally connected with the arm 120 for movement about a horizontal pivot axis 132. Thus, the upper shaft is capable of swinging movement corresponding to arrows 133. A shock absorber can be used to limit the swinging movement of the housing 131, however, because of the unique flexible nature of the brushes of the present invention the use of such shock absorbers may not be necessary. In the past, such shock absorbers have been used to counteract the bouncing movement of the brushes whereby the brushes bounce away from a vehicle when the vehicle contacts the brushes. Such a bouncing movement is reduced in accordance with the present invention and therefore the shock absorbers can be eliminated if desired. The upper drive shaft 130 is connected with a lower rotatable steel cable 134 by means of a yieldable coupling device 150. The yieldable coupling device is formed from an upper plate 150a and a lower plate 150b. The upper and lower plates are spaced apart and are loosely connected by six rigid connecting members 150c, such as a nut and bolt arrangement. Because of the space between the upper plate 150a and the lower plate 150b, the plates can tilt relative to one another when the brush is displaced by contact with a vehicle. Various types of yieldable coupling devices can be utilized in accordance with the present invention. However, because of the flexible nature of the brushes, the yieldable coupling device can be eliminated if desired. The preferred coupling device is disclosed in more detail in an application to James W. Roncaglione entitled, "VEHICLE WASHING APPARATUS HAVING A YIELDABLE BRUSH SHAFT COUPLING, Ser. No. 415,928 filed on Sept. 8, 1982. The entire contents of this application are hereby expressly incorporated by reference.

Figure 19:
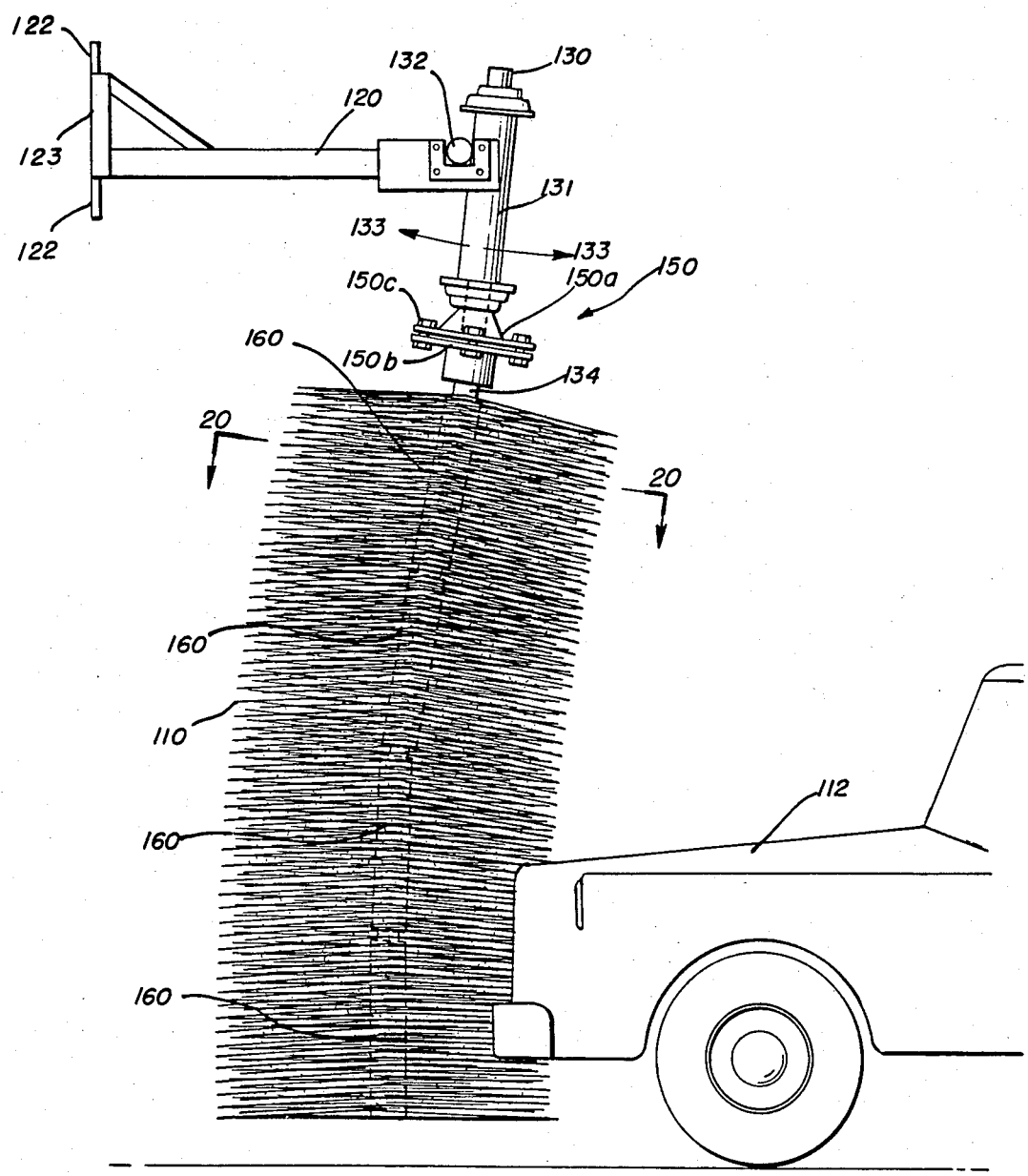
FIG. 19 is a side view showing the flexing of the vehicle washing brush and the pivoting of the brush mounting when a vehicle contacts the brush.

The improved vehicle washing brush includes a cable 134, preferably a metal cable, and a plurality of washing material support members which are secured to the cable. The diameter of the metal cable may vary depending upon the size and weight of the brushes, the length of the brushes and the mounting arrangement for the brushes. A cable of $1\frac{1}{2}$ inch diameter has been found to be useful. Thus, when relatively large brushes are utilized, a diameter of $\frac{1}{2}$ inch to 4 inches is contemplated, preferably about $\frac{7}{8}$ inch to $2\frac{1}{2}$ inches. Smaller diameter cables may be used for smaller brushes. FIG. 19 illustrates a brush having four elongate tubular shaped rigid support members 160. The support members 160 are securely fastened to the metal cable 134. When a vehicle contacts the brush, the support members can move relative to one another whereby the brush can bend and conform to the side surfaces of a vehicle being washed. Preferably, a small space is provided between the washing material support members so that the washing material support members can move with respect to one another when the metal cable flexes. Flexible brushes of the type disclosed in application Ser. No. 493,345 filed on May 10, 1983 entitled, VEHICLE WASHING APPARATUS HAVING FLEXIBLE BRUSHES in the name of James W. Roncaglione can also be utilized in accordance with the present invention. The entire contents of this application are hereby expressly incorporated by reference.

Figure 20:
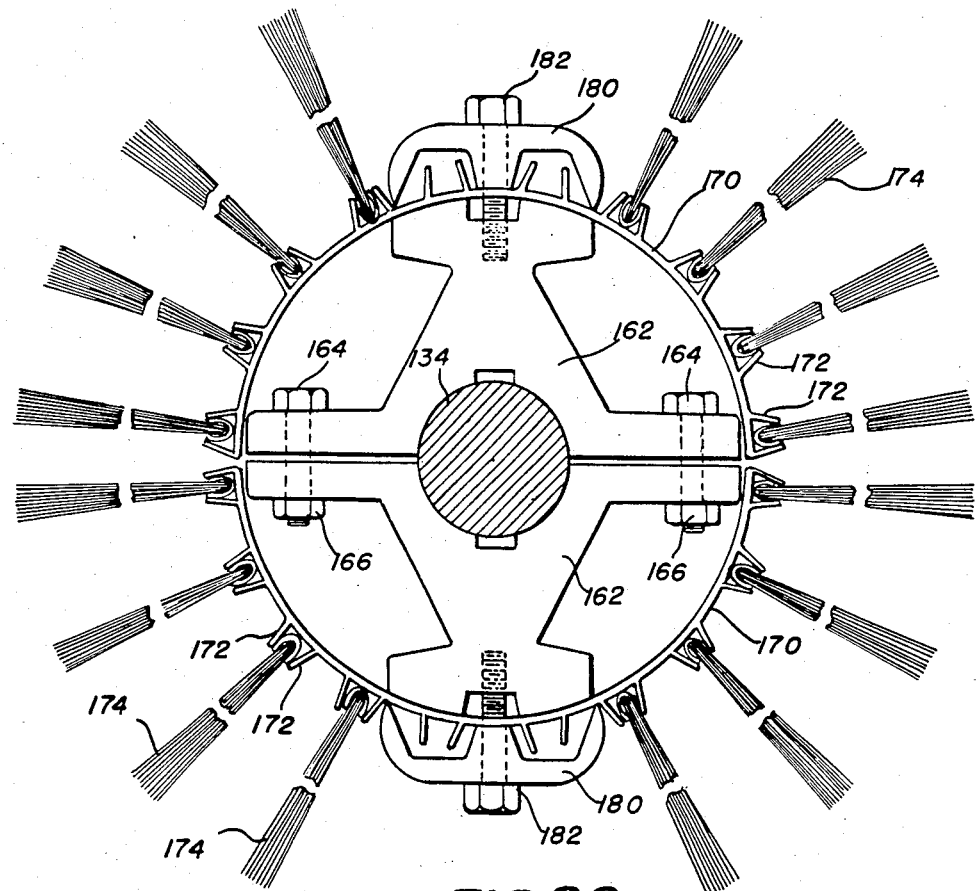
FIG. 20 is an enlarged cross-sectional view of the bracket and bristle holder arrangement taken through line 20—20 of FIG. 19.
Figure 21:
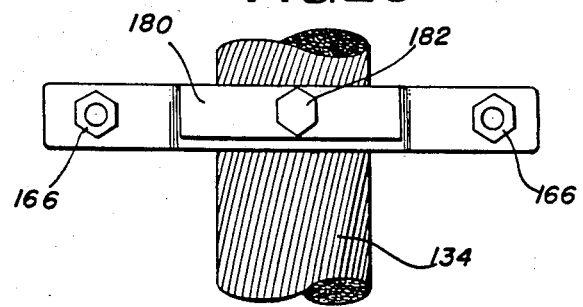
FIG. 21 is a side view of FIG. 20 with the bristle holder member removed.
Figure 21:
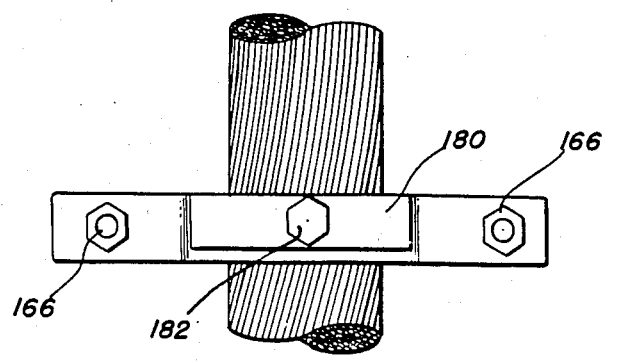

As shown in FIGS. 20 and 21, the vehicle washing support members include a pair of inner clamping members 162 which are securely fastened to the steel cable 134 by a pair of bolts 164 and nuts 166. The inner clamping members 162 are securely fastened to the cable 134 so that when the cable is rotated the rotational movement is transmitted to the inner clamps 162. The washing material support members also include a pair of elongate semi-circular trough shaped bristle support members 170 which are secured to the inner clamp members 162. The bristle support members 170 are provided with bristle holder fingers 172 which hold bristle material 174 therein. Thus, the two bristle support members 170 form a generally tubular configuration 160 as shown in FIG. 19. The washing material support members also include a pair of outer clamps 180 which secure the bristle support members 170 to the inner clamp members 162. The outer claims are secured to the inner clamps by a bolt 182. FIG. 21 is a side view of the washing material support member with the bristle holders 170 removed. Thus, each generally tubular washing material support member 160 (which is formed by a pair of bristle holder support members 170) is supported at each end by the clamping arrangement shown in FIG. 20. It is clear that other types of washing material support members can be utilized in accordance with the present invention other than the preferred support member shown in FIGS. 20 and 21.

Figure 22:
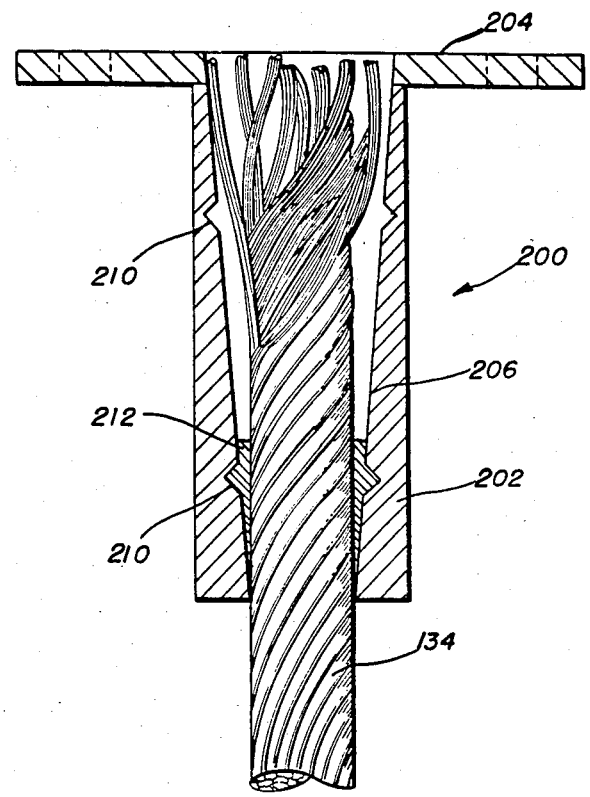
FIG. 22 is a cross-sectional view which shows the connection between the steel cable and the cable coupling member.
Figure 23:
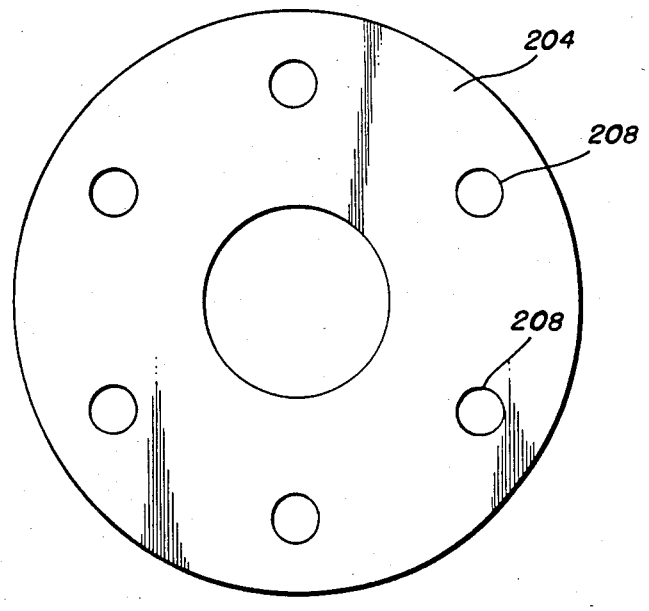
FIG. 23 is a top view of the coupling member of FIG. 22.

FIG. 22 shows a preferred arrangement for coupling the metal cable to a coupling member. The coupling member 200 preferably comprises a generally tubular portion 202 and a plate shaped upper portion 204. The tubular portion 202 contains a truncated cone-shaped cavity 206 which is adapted to receive on longitudinal end of the metal cable 134. The upper disc-shaped plate 204 contains six radially spaced holes 208. Thus, the coupling member can be connected to the means for rotating the brush by means of six bolt and nut arrangements. The truncated cone-shaped cavity 206 preferably contains a pair of circular V-shaped grooves 210 on the inner surface thereof. The purpose of these grooves is to allow a bonding material to securely bond the metal cable 134 to the coupling member 200. Alternatively, projections can be provided on the inner surface of the cavity to accomplish a similar result.

The coupling member is produced by inserting one end of the metal cable 134 into the cavity 206. After the cable is in the cavity, the individual strands of the metal cable are pulled apart and frayed to increase the surface area and to increase the diameter of one end of the cable. After the cable is pulled apart and frayed, the strands are cleaned with an appropriate solvent and dried. Thereafter, a bonding material 212 is poured into the cavity. The bonding material is preferably a molten metal such as molten zinc or molten lead. However, the bonding material can be any other type of liquid material which hardens after it is poured into the cavity. FIG. 22, for ease of illustration, shows the cavity only partially filled. However, it is preferable to fill the cavity to the top with a bonding material. By utilizing the improved coupling of the present invention a strong joint for rotating the metal cable can be formed. Since the brush assemblies to be rotated can weigh about 800 pounds, a strong bond is necessary to connect the metal cable.

Figure 24:
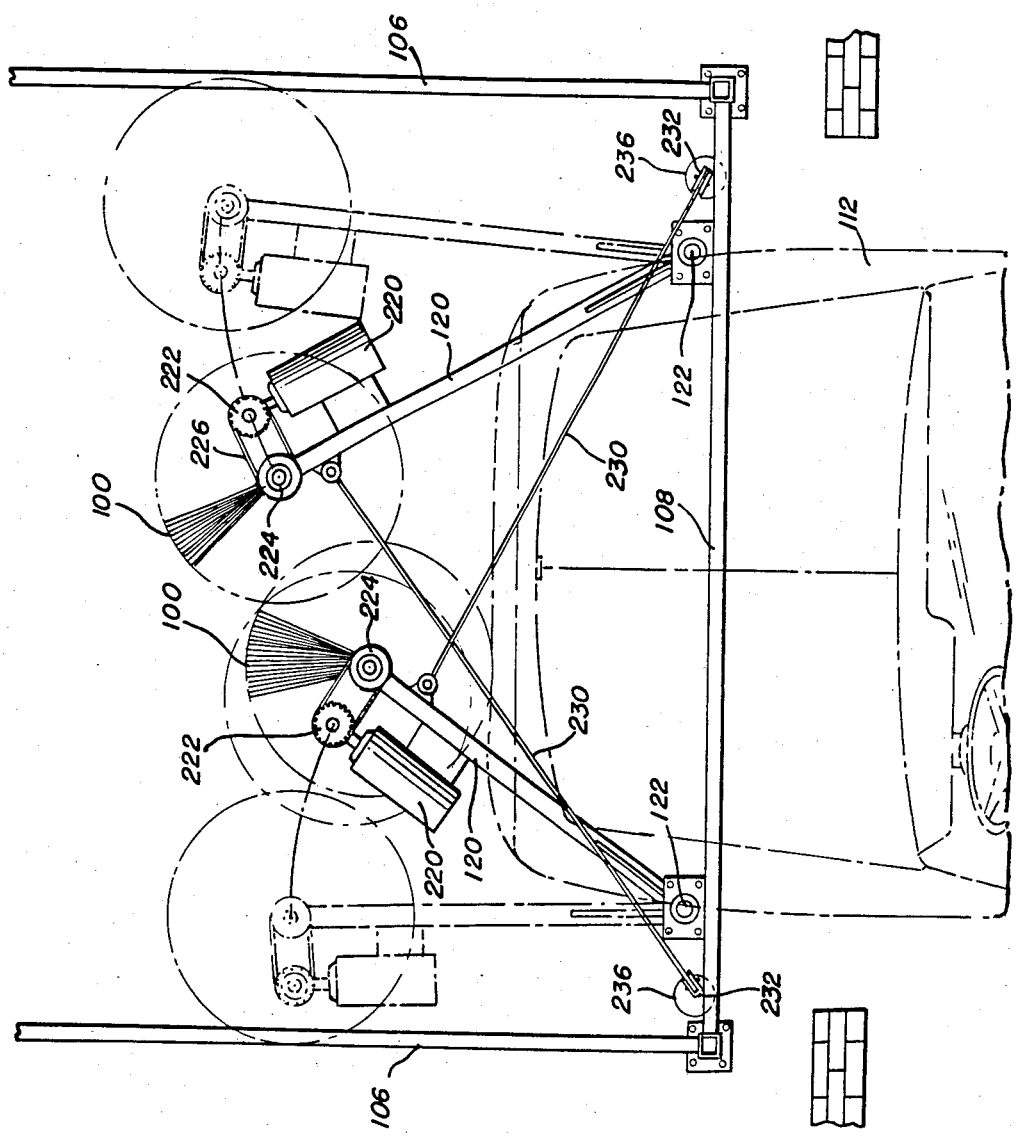
FIG. 24 is a top view of the apparatus shown in FIGS. 15-18

FIG. 24 is a top view which shows the mounting for the brushes of the present invention. The reference numerals in FIG. 24 are the same as in FIG. 19. FIG. 24 also shows a motor 220, sprocket 222, 224 and chain 226 arrangement which can be utilized to rotate the brushes. The brushes are preferably urged toward each other by a cable 230, pulley 232, and weight 236 arrangement. Before a vehicle enters the apparatus the brushes are in a first closed position whereby the brushes are in the path of the vehicle to be washed. When the vehicle passes through the apparatus, the brushes contact the vehicle and swing apart to a second opened position whereby the vehicle passes between the brushes. FIG. 24 shows the brushes in the first closed position and in the second fully opened position. However, as shown in FIGS. 15–18, it is not necessary for the brushes to swing fully apart because of the flexible nature of the brushes and the flexible coupling which couples the brushes with the means for rotating the brushes. Thus, when the two brushes are contacting the sides of the vehicle, the tops of the brushes may be closer together than the bottoms of the brushes. This arrangement is shown in FIGS. 16–18. By utilizing the flexible brushes of the present invention which are made from metal cables the brushes can more easily conform to the surfaces of the vehicle being washed.

Figure 25:
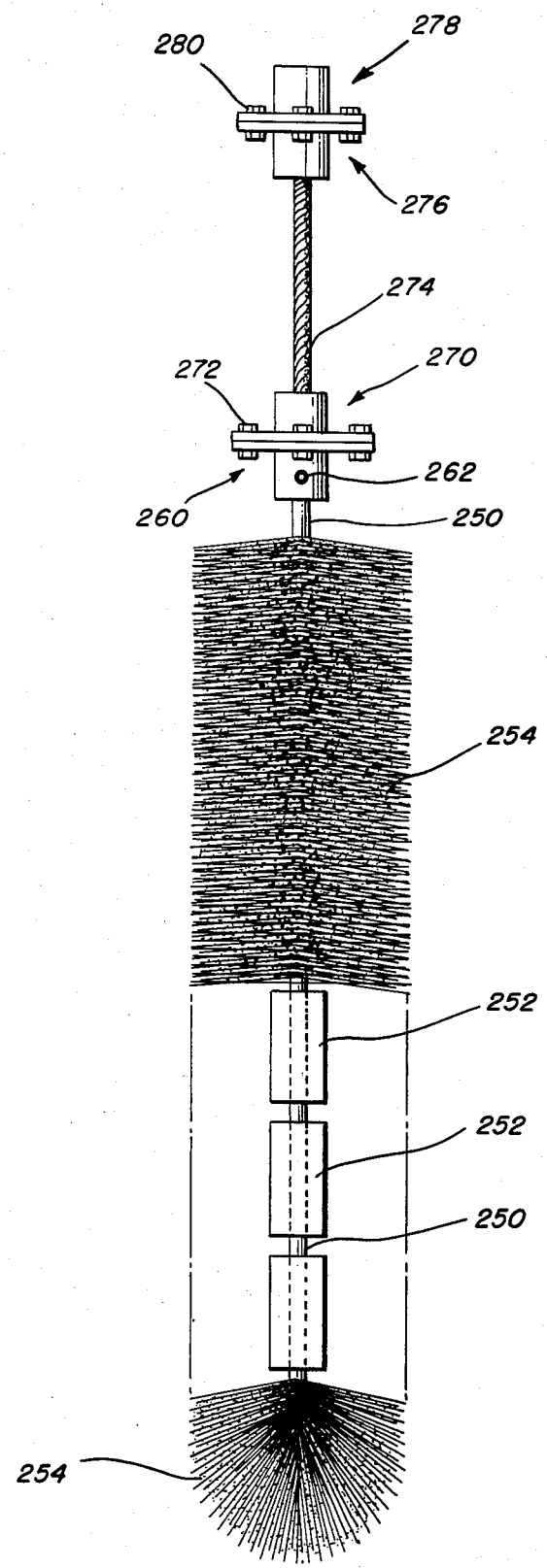
FIG. 25 is a side view of another embodiment of the flexible washing member.

FIG. 25 is a side view of another embodiment of the flexible washing member. In this embodiment a steel rod 250 supports a number of elongate tubular bristle holders 252. A coupling having upper and lower disc-shaped portions, 270 and 260, respectively, joins the steel rod to a steel cable 274 which is usually 4" to 6" long but can be longer,. Bolts 272 fasten the upper and lower halves of the coupling together. A bolt 262 securely fastens the steel rod (axial support member) to the coupling. Another (upper) coupling having upper and lower disc-shaped portions, 278 and 276, respectively, joins the steel cable to a drive mechanism (not shown). Bolts 280 fasten the upper and lower halves of this coupling together. Alternatively, the steel rod 250 may be formed from a plastic shaft, a metal or plastic cable or any other appropriate structure or material capable of supporting a washing material as defined hereinabove.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:
1. A flexible vehicle washing member, comprising:
a brush support member comprising a flexible cable;
washing material arranged along the length of said brush support member;
a coupling member arranged around said flexible cable adjacent one end thereof; and
a bonding material securely bonding said cable to said coupling member.

2. A flexible vehicle washing member according to claim 1, wherein said coupling member has a cone-shaped cavity adapted to receive said cable and wherein said cavity is filled with said bonding material to securely bond said cable to said coupling member.

3. A flexible vehicle washing member according to claim 2, wherein indentations or protrusions are formed in said cone-shaped cavity to improve the bond between said bonding material and said coupling member.

4. A flexible vehicle washing member according to claim 2, wherein said bonding material is poured into said cavity in a liquid state and allowed to harden therein whereby said bonding material enters the surface irregularities of said cable thereby forming a strong bond between said cable and said bonding material.

5. A flexible vehicle washing member according to claim 1, wherein said bonding material is a metal.

6. A flexible vehicle washing member according to claim 1, wherein said bonding material is lead or zinc.

7. A flexible vehicle washing member according to claim 1, wherein said bonding material is plastic.

8. A vehicle washing apparatus, comprising:
overhead support means located above a path of a vehicle to be washed;
an elongate vertically disposed rotary vehicle member supported by said overhead support means and having a free lower end and having a flexible substantially non-resilient first support portion comprising an elongate cable means, an elongate second support portion co-axial with said first support portion, and washing material secured to said second support portion; and rotating means for imparting rotary motion to said elongate washing member.

9. The vehicle washing apparatus according to claim 8 wherein the flexible substantially non-resilient first support portion is a steel cable.

10. The vehicle washing apparatus according to claim 8, wherein said second support portion is formed of a material which is of a different flexibility than the material from which said first support portion is formed.

11. The vehicle washing apparatus according to claim 8, wherein said first support portion is a single cable and said second support portion is a shaft.

12. The vehicle washing apparatus according to claim 8, wherein the washing means comprises:
a pair of brushes connected with said overhead support means.

13. A vehicle washing apparatus, comprising:
overhead support means arranged above or adjacent to a vehicle to be washed;
a vertically disposed flexible elongate substantially non-resilient support member formed of a braided cable connected with said overhead support means;
rotating means for imparting rotary motion to said flexible elongate support member; and
an elongate vertically disposed rotatable washing member having a free lower end and being supported by said flexible elongate non-resilient support member.

14. A vehicle washing apparatus, comprising:
overhead support means located above a path of a vehicle to be washed;
an elongate vertically disposed and rotatable washing member having a free lower end and being supported at the upper end thereof by said support means, said elongate washing member comprising a substantially non-resilient flexible portion comprising an elongate cable and washing material; and
rotating means for imparting rotary motion to said elongate washing member.

15. The vehicle apparatus according to claim 14, wherein said rotatable washing member is normally positioned in the path of a vehicle to be washed and movable washing member support means are provided for allowing said rotatable washing member to move to a side of the vehicle so that said washing member washes the front and at least one side of said vehicle.

16. The vehicle washing apparatus of claim 14, wherein said substantially non-resilient flexible portion is arranged exactly in the central portion of said washing material.

17. The vehicle washing apparatus of claim 14, wherein said substantially non-resilient flexible portion is a braided cable.

18. The vehicle washing apparatus of claim 14, wherein said substantially non-resilient flexible portion is a metal cable.

* * * * *